United States Patent [19]
Bohannon

[11] 3,844,386
[45] Oct. 29, 1974

[54] AUTOMATIC EMERGENCY BRAKING SYSTEM

[76] Inventor: Alonzo Bohannon, 105 Rhode Island Ave., Washington, D.C. 20001

[22] Filed: June 1, 1971

[21] Appl. No.: 148,586

[52] U.S. Cl............................ 188/167, 188/106 R
[51] Int. Cl................................................ B60t 7/06
[58] Field of Search......... 188/106 F, 106 P, 106 R, 188/167, 2 R

[56] References Cited
UNITED STATES PATENTS

| | | | |
|---|---|---|---|
| 1,767,761 | 6/1930 | Insul | 188/167 X |
| 2,945,546 | 7/1960 | Niederoest | 188/167 X |
| 3,000,459 | 9/1961 | Silver et al. | 188/167 X |

FOREIGN PATENTS OR APPLICATIONS

| | | | |
|---|---|---|---|
| 795,790 | 1/1936 | France | 188/167 |
| 426,630 | 4/1935 | Great Britain | 188/167 |

*Primary Examiner*—Duane A. Reger

[57] ABSTRACT

A spring loaded emergency brake operator is actuated on overtravel of the brake pedal. A latch mechanism is connected between the pedal and the operator to release a spring mechanism to apply the vehicle brakes.

1 Claim, 7 Drawing Figures

PATENTED OCT 29 1974 3,844,386
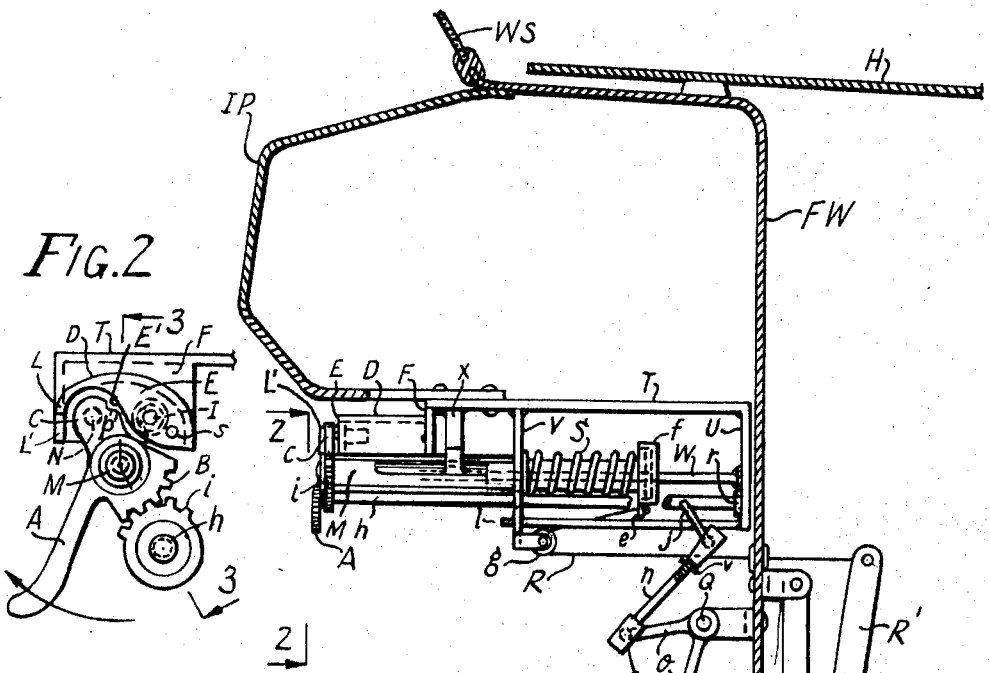
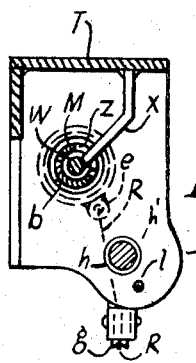
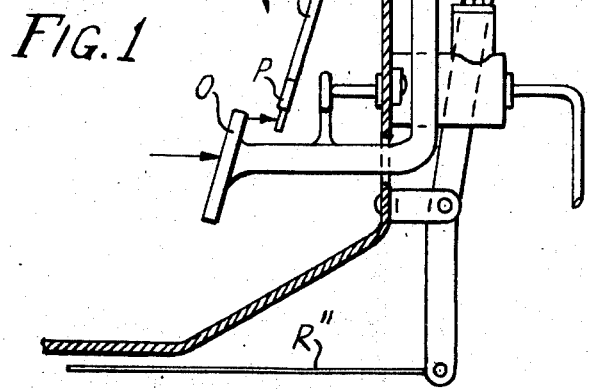
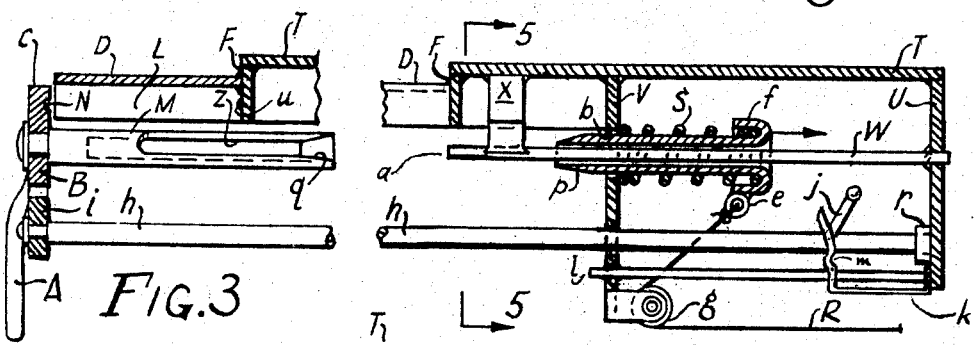
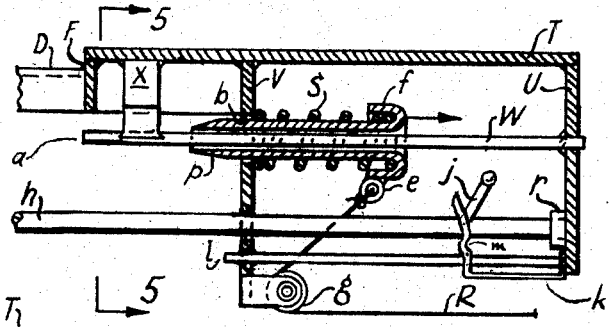
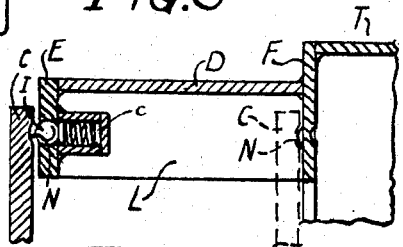
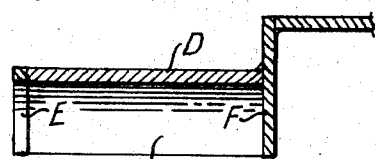

AUTOMATIC EMERGENCY BRAKING SYSTEM

This invention relates to devices designed to make the operation of emergency brakes more certain and less subject to the vagaries of the driver's reaction time, mechanical inertia, etc.

It should also be easy and cheap to manufacture and readily adapted to cars already on the road without waiting for manufacturers to incorporate it into the design of their new models.

Numerous arrangements for the purpose have been proposed before, but the present invention incorporates certain improvements and novel features which will be more fully apparent from the following description and the accompanying drawings, in which FIG. 1 is a right elevation of one version of the device shown in situation behind the fire wall (FW), hood (H), and beneath the instrument panel (IP) where it is mounted by means of bolts, screws, rivets or the like.

FIG. 2 is an enlarged view of the operating control panel of the device taken roughly, along line 2—2 of FIG. 1. Principal component here is the one-piece handle-cam-gear assembly, A-B-C.

FIG. 3 is a longitudinal section of some of the main elements of the rearward portion of the device taken along 5—5 (FIG. 4), as FIG. 4 shows detail of the forward portion.

FIG. 5 is a partial section following roughly 3—3, (FIG. 2) taken just rearward of jackshaft bracket X. Among other things it shows rear end plate V, and secondary shaft bearing h'.

FIG. 6 is an expanded section detailing the detent holding arrangement.

FIG. 7 shows in longitudinal section the relation between control block D, cam guide L, face plate E and back plate F.

Referring now to FIG. 1, the device consists of rigid frame member T, to which is attached crosswise forward end plate U, and rear end plate V.

Rear end plate V, has hole b, (FIGS. 4 and 5) large enough to pass cylindrical portion of bell tube f, but too small for mainspring S, which is thus trapped between the flange of the belltube and forward face of end plate V. Centered longitudinally through belltube f, and hole i, is jackshaft W, which roughly, extends as far rearward as backplate F, and is braced in position by bracket X, which is fixed to frame member T, as shown in FIGS. 1, 4 and 5.

Slidably mounted upon the rearward portion a, of jackshaft W, is slotted control tube M. The forward end of tube M, is slipped over jackshaft portion a, and slot Z, allows it to slide forward past bracket X, until its cup face q, contacts cone face p, of belltube f. p and q are then made permanently fast (as by welding) and the entire assembly is free to slide back and forth along jackshaft a-W.

Rotatably mounted upon the rear end of control tube M, is the control handle assembly consisting of handle A, main gear B, and cam C. This assembly is a rigid plate with segments shaped according to the function served by each. The cam is shaped to follow the guide L; the gear sector matches secondary gear i (FIGS. 1 and 2).

Below and to the right of jackshaft a-W is rotatably mounted secondary shaft h, with a bearing in front end plate U, and another in rear plate V. Secondary gear i, is fixed upon the rear end of this shaft and rotates with it. This shaft also carries a ball-headed spur j, which functions as a lever as this shaft is rocked back and forth.

Re-enforcing rod 1 has its forward end fixed to end plate U, and its rear end plate is fixed to end plate V.

Various accessories and fittings complete the device.

Trip lever P pivots about shaft Q, and one of its horns o, is connected through trip link n, to ball-headed secondary shaft spur j, and since the ball functions as a universal joint, downward-forward motion of trip lever P causes clockwise rotation of secondary shaft h.

O is the brake pedal and not a part of the device; but trip lever is so disposed ahead of it (or below, as the case may be) that in case it gives way and drops to the floorboards it will engage trip lever P, on the way down.

Pull cable R is fastened to cable eye e, at the forward end of belltube f, threaded over pulley g, thence through the fire wall (FW) to pivoted cable lever R', the lower end of which actuates brake rods R''.

Trip link n, carries knurled adjusting nut v, by means of which the height of trip lever P, may be raised or lowered.

FIG. 2 shows a frontal view of the control panel of the device as it appears in the "at rest" position such as a vehicle normally parked at the curb.

The ideal situation would be to have the vehicle equipped with an inter-trip mechanism that would actuate the trip lever P, every time the parking brake is pulled up. But in the absence of this the driver can get the same result by just pressing the trip lever (P) with his toe.

In any case it is assumed that the cycle of operation begins with the device in this position.

Looking at FIG. 2 it is observed the handle in the dependent position. Setting cam C, is resting against the back plate (F) with the detent depression N, (FIG. 3) meshing with a boss, u, on the back plate to prevent it from flopping around.

Mainspring S is in the expanded position holding tension on pull cable R, and through lever R', on brake rods R''. So in this position the parking brakes are always "on."

In order to move the vehicle it is necessary to take the parking brakes "off."

The arrangement of the device is such that in taking the parking brakes "off", the emergency mechanism is simultaneously set.

Operation is as follows:

Dependent handle A is grasped and pulled back until setting cam C clears face plate cut-out E'. At this point main gear B will mesh with secondary gear segment i, and when handle A is rotated clockwise, secondary gear segment i and its attached shaft h, are rotated counterclockwise raising the ball head of attached spur j, and along with it connecting link n and trip lever P.

This movement of handle A carries setting cam C across face plate E until cam notch p' is against stop pin small s. At this point spring backed detent ball l falls into detent depression N on the back of setting cam C, and holds the position stable.

(A lip L' of guide L-FIGS. 1 and 2- extends rearward slightly beyond the plane of face plate E, and serves as a stop to prevent cam C from falling in the counterclockwise direction as it passes through cut out E', and comes in position to glide clockwise across face plate E.)

As explained previously, control tube M and bell tube f, have been joined into a single assembly, together with control handlesetting cam-gear assembly, so that when handle A is pulled back all these parts follow as a unit, compressing mainspring S, and storing up energy to be used in stopping the vehicle in an emergency.

The particular emergency intended is any failure of the regular foot braking system. If this should happen it would be signalled by the brake pedal O failing to hold and dropping to the floor.

Looking particularly at FIG. i, it will be seen that in the event that brake pedal collapses for some reason and falls towards the floor, it will depress trip lever P, on the way down thus setting the device in motion.

Downward motion of trip lever P will be transmitted through link n, to the ball head of secondary shaft spur j, where it becomes clockwise rotation of secondary shaft h, together with its attached gear i. Gear i, in turn, rotates main gear B counterclockwise, the generated force driving detent ball l (FIG. 6) forward against its spring c, releasing detent and allowing setting cam C to move off face plate E into cut out section E'.

At this point mainspring S is enabled to expand pulling bell tubecontrol tube assembly with it and setting cam C slides along cam guide L, until it comes to rest against back plate F.

At the same point something else happens: ball headed spur j, sliding along shaped spring clip k, drops into holding crook m, (this is the point where main gear B, as it falls away to back plate F, dis-engages from secondary gear i) and stays there until it is picked up on the return cycle of main gear B, re-engaging secondary gear i, as the device is reset by pulling back on handle A.

As aforestated, expansion of mainspring S pulls bell tube forward carrying pull cable eye e and attached cable R with it. This pull is directed over cable pulley g, through the fire wall to the upper end of pivoted lever R', and thus to brake rods R'', stopping the vehicle. The parking brake remains "on," and the cycle returns to its original condition.

The foregoing outlines one embodiment of my device, but it is to be understood that equivalent arrangements may be used without departing from the spirit of this invention. The invention is not limited to the form shown but may be incorporated in various other forms having equivalent functions.

The present showing connects the pull cable to brake rods actuating shoes in the rear wheels; but by redirecting the cable it will function equally well with systems which apply the braking action to a rotating drum connected to the drive shaft.

Additionally, the device may be set in motion by the driver at any time either by deliberately releasing the control handle manually, or by kicking the trip with the foot.

What I claim is

1. An emergency brake comprising a housing having a pair of spaced end plates, a jackshaft connected to one end plate and extending through the other end plate, a belltube slidably mounted on the jackshaft, a spring biasing one end of the belltube in an actuating direction, a control handle having a rotatable cam gear connected to the other end of the belltube, a face plate having a cut-out portion, connected to the housing for holding the belltube in a retracted position against the force of the spring, a release gear mechanism connected between the cam gear and vehicle brake pedal for rotating the cam gear to release the cam gear through the cut-out portion on overtravel of the brake pedal, a cable connected between said one end of the belltube and the emergency brake for allowing the spring to force the belltube in the actuating direction to apply the emergency brake.

* * * * *